United States Patent
McCallum

(10) Patent No.: US 11,470,065 B2
(45) Date of Patent: Oct. 11, 2022

(54) PROTECTION OF PRIVATE DATA USING AN ENCLAVE CLUSTER

(71) Applicant: Red Hat, Inc., Raleigh, NC (US)

(72) Inventor: Nathaniel McCallum, Raleigh, NC (US)

(73) Assignee: RED HAT, INC., Raleigh, NC (US)

(*) Notice: Subject to any disclaimer, the term of this patent is extended or adjusted under 35 U.S.C. 154(b) by 586 days.

(21) Appl. No.: 16/514,088

(22) Filed: Jul. 17, 2019

(65) Prior Publication Data
US 2021/0021580 A1    Jan. 21, 2021

(51) Int. Cl.
*H04L 9/40* (2022.01)
*G06F 9/50* (2006.01)
*H04L 67/104* (2022.01)
*H04L 67/1001* (2022.01)

(52) U.S. Cl.
CPC ........ *H04L 63/0492* (2013.01); *G06F 9/5055* (2013.01); *H04L 67/1001* (2022.05); *H04L 67/1051* (2013.01)

(58) Field of Classification Search
CPC .................................................. H04L 67/1051
See application file for complete search history.

(56) References Cited

U.S. PATENT DOCUMENTS

| | | | |
|---|---|---|---|
| 8,191,086 B2 * | 5/2012 | Sandland | ............ H04L 63/0815 718/1 |
| 8,762,642 B2 | 6/2014 | Bates et al. | |
| 9,483,473 B2 | 11/2016 | Ansel et al. | |
| 9,893,897 B2 | 2/2018 | Li et al. | |
| 2018/0295115 A1 | 10/2018 | Kumar et al. | |

OTHER PUBLICATIONS

*Protecting Sensitive Information in your Cluster*, Nov. 14, 2018, 6 pgs., IBM Cloud Kubernetes Service, https://console.bluemix.net/docs/containers/cs_encrypt.html#encryption.

Yanhui Zhao; Li Shen; Anand Kashyap and Ambuj Kumar, *Fortanix Provides Intel® SGX-protected KMS with Alibaba Cloud*, Oct. 16, 2018, Alibaba Cloud; Fortanix Inc., https://www.alibabacloud.com/blog/594075.

Jatin Demla, *A Step-by-Step Guide for Protecting Sensitive Data in Docker*, Dec. 13, 2017, Dzone Security Zone, https://dzone.com/articles/a-step-by-step-guide-for-protecting-sensitive-data.

* cited by examiner

*Primary Examiner* — Esther B. Henderson
(74) *Attorney, Agent, or Firm* — Haynes and Boone, LLP

(57) ABSTRACT

Systems and methods are disclosed for protecting data. An example method includes creating an outer cluster on one or more host machines coupled to a network. The outer cluster includes a plurality of outer nodes. The method also includes creating an enclave cluster on the outer cluster. The enclave cluster includes a plurality of inner nodes, and each inner node of the plurality of inner nodes executes within an enclave of the one or more host machines. The method further includes exposing an application programming interface (API) to the outer cluster, where invocation of the API causes at least one inner node of the enclave cluster to perform an operation on data. The method also includes performing, by an inner node of the enclave cluster, the operation on the data in response to invocation of the API by an outer node of the outer cluster.

20 Claims, 6 Drawing Sheets

PROTECTION OF PRIVATE DATA USING AN ENCLAVE CLUSTER

TECHNICAL FIELD

The present disclosure generally relates to a cluster of nodes, and more particularly to protecting data using an enclave cluster.

BACKGROUND

Cloud computing is a set of principles and approaches to deliver computing infrastructure, services, platforms, and/or applications—sourced from clouds—to users on-demand across a network. Clouds may be pools of virtual resources (such as raw processing power, storage, or cloud-based applications) orchestrated by management and automation software so they can be accessed by users on-demand.

BRIEF SUMMARY

Methods, systems, and techniques for protecting data are provided.

According to an example, a method of protecting data includes creating an outer cluster on one or more host machines coupled to a network. The outer cluster includes a plurality of outer nodes. The method also includes creating an enclave cluster on the outer cluster. The enclave cluster includes a plurality of inner nodes, and each inner node of the plurality of inner nodes executes within an enclave of the one or more host machines. The method further includes exposing, by the enclave cluster, an application programming interface (API) to the outer cluster, where invocation of the API causes at least one inner node of the enclave cluster to perform an operation on data. The method also includes performing, by at least one inner node of the enclave cluster, the operation on the data in response to invocation of the API by an outer node of the outer cluster.

According to another example, a system for protecting data includes a clustering module that creates an outer cluster on one or more host machines coupled to a network and creates an enclave cluster on the outer cluster. The outer cluster includes a plurality of outer nodes, the enclave cluster includes a plurality of inner nodes, and each inner node of the plurality of inner nodes executes within an enclave of the one or more host machines. The system also includes a computation module that exposes, by the enclave cluster, an API to the outer cluster and performs, by at least one inner node of the enclave cluster, the operation on the data in response to invocation of the API by an outer node of the outer cluster.

According to another example, a non-transitory machine-readable medium includes a plurality of machine-readable instructions that when executed by one or more processors are adapted to cause the one or more processors to perform a method including: creating an outer cluster on one or more host machines coupled to a network, the outer cluster including a plurality of outer nodes; creating an enclave cluster on the outer cluster, the enclave cluster including a plurality of inner nodes, and each inner node of the plurality of inner nodes executing within an enclave of the one or more host machines; exposing, by the enclave cluster, an API to the outer cluster, where invocation of the API causes at least one inner node of the enclave cluster to perform an operation on data; and performing, by at least one inner node of the enclave cluster, the operation on the data in response to invocation of the API by an outer node of the outer cluster.

BRIEF DESCRIPTION OF THE DRAWINGS

In the drawings, like reference numbers may indicate identical or functionally similar elements. The drawing in which an element first appears is generally indicated by the left-most digit in the corresponding reference number.

DETAILED DESCRIPTION

Figure 1:
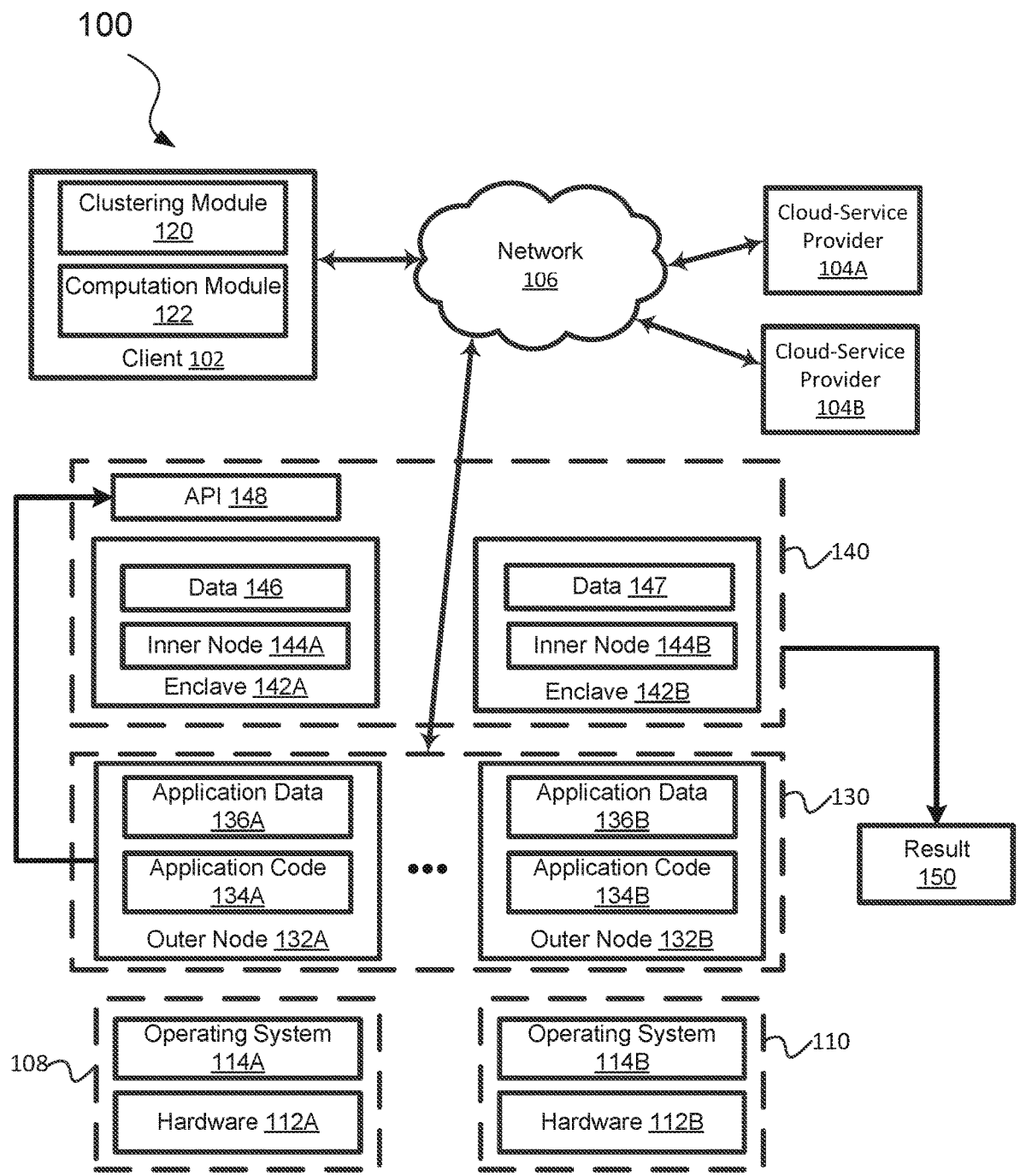
FIG. 1 is a block diagram illustrating an example system for protecting data in a clustered environment.

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

In cloud computing, a client using the resources provided by a cloud-service provider may create an outer cluster on one or more host machines. The outer cluster includes a plurality of outer nodes that communicate with each other and work towards a common goal. The nodes in the outer cluster may appear to end users and applications as if they are on one single physical server. The combined processing power of the multiple outer nodes in the outer cluster can provide greater throughput and scalability than is available compared to the processing power from a single node. An outer node may execute application code using application data. If the cloud-service provider provisions the operating system and hardware that stores the application code and/or application data to the client, the operating system is owned by a third party and it may view the application data. Such viewing of and accessibility to the application data by the third party (e.g., cloud-service provider) may be undesirable if the client desires to keep this data private or secret.

A solution to the problem of a third party viewing the client's data may include developing a nested set of clusters to protect the data. In some examples, the client may create an enclave cluster on the outer cluster. The enclave cluster includes a plurality of enclaves, each enclave corresponding to an outer node of the outer cluster. Each enclave may provide an encrypted environment that stores an inner node and private data. The enclave may be a hardware security feature that is provided by the hardware. Accordingly, if data or code is stored within the enclave, the owner of the provisioned operating system and/or hardware is unable to view the data or code, respectively.

In some examples, the client may create an outer cluster on one or more host machines coupled to a network. The outer cluster includes a plurality of outer nodes. The client may create an enclave cluster on the outer cluster. The enclave cluster may include a plurality of inner nodes, and each inner node of the plurality of inner nodes may execute within an enclave of the one or more host machines. In an example, for each outer node of the outer cluster, the client may create an enclave corresponding to the hardware on which the respective outer node executes and may create an inner node within the enclave. The enclave may also store data that is accessible by the inner node.

An inner node may be selected as a leader and be the first member of the enclave cluster. Candidate inner nodes may attempt to establish trust relationships with the leader or other member of the enclave cluster. If a trust relationship is established, the candidate inner node may join the enclave cluster and become a member of the enclave cluster. Each of the inner nodes of the enclave cluster may have access to the data that is stored within the respective enclave. For example, members of the enclave cluster may replicate data to other members of the cluster, without the data being viewable by non-members of the enclave cluster (e.g., the outer cluster). The inner nodes may establish an encrypted channel for performing the data replication, and the data is stored in the respective enclave and may be accessible by the inner nodes.

The enclave cluster exposes an application programming interface (API) to the outer cluster, where invocation of the API causes at least one inner node of the enclave cluster to perform an operation on data. Accordingly, the outer cluster may request that certain operations be performed on the data via use of the API, without having direct access to the data. At least one inner node of the enclave cluster may perform the operation on the data in response to invocation of the API by an outer node of the outer cluster. In an example, a single inner node of the enclave cluster may perform the operation on the data. In another example, a plurality of inner nodes of the enclave cluster may work together to perform the operation on the data.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "receiving," "generating," "creating," "performing," "sending," "exposing," "returning," "replicating," "establishing," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

FIG. 1 is a block diagram 100 illustrating an example system for protecting data in a clustered environment. FIG. 1 includes a client 102 and one or more cloud-service providers 104 coupled over a network 106. The network 106 may be, for example, a private network (e.g., local area network (LAN), wide area network (WAN), intranet, etc.), a public network (e.g., the Internet), or a combination thereof. The network 106 may include various configurations and use various protocols including the Internet, World Wide Web, intranets, virtual private networks, WANs, LANs, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

The client 102 may be a personal computer (PC), workstation, mobile device (e.g., a mobile phone, personal digital assistant (PDA), tablet, and laptop), game console, set-top box, kiosk, embedded system, or other device having at least one processor and memory. The client 102 may also be an application run on a PC, server, database, etc. Additionally, the client 102 may be a fat client (e.g., a client that performs local processing and data storage), a thin client (e.g., a client that performs minimal or no local processing and minimal to no data storage), and/or a hybrid client (e.g., a client that performs local processing but little to no data storage).

The client 102 may use a cloud-service provider for storing, managing, and processing data. The cloud-service provider 104A, 104B is a third party that offers resources 108, 110 to one or more clients 102 for storing, managing, and processing data. In the example illustrated in FIG. 1, the resources 108 include hardware 112A and an operating system 114A, and the resources 110 include hardware 112B and an operating system 114B. A first host machine may host the resources 108 and a second host machine may host the resources 110, or the same host machine may host both the resources 108 and resources 110. Although the resources are shown as including hardware and an operating system, this is not meant to be limiting, and the cloud-service provider 104A, 104B may offer additional or different resources. Additionally, the cloud-service providers 104A and 104B may be the same or different cloud-service providers.

The hardware 112A, 112B may include a memory, one or more processors, or other hardware device. The client 102 may use the processor for executing software (e.g., machine-readable instructions) and using or updating data stored in the memory. A "processor" may also be referred to as a "central processing unit," "CPU" or "physical processor" herein. A processor shall refer to a device capable of executing instructions encoding arithmetic, logical, or input/output (I/O) operations. In an example, a processor may follow the Von Neumann architectural model and may include an arithmetic logic unit (ALU), a control unit, and a plurality of registers. In a further aspect, a processor may be a single-core processor that is typically capable of executing one instruction at a time (or processing a single pipeline of instructions), or a multi-core processor that may simultaneously execute multiple instructions. In another aspect, a processor may be implemented as a single-integrated circuit, two or more integrated circuits, or may be a component of a multi-chip module (e.g., in which individual microprocessor dies are included in a single integrated circuit package and hence share a single socket).

The memory may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid state drives typically have relatively larger storage volume but relatively slower performance. Other types of memory, such as those used for RAM, are optimized for speed and may be referred to as "working memory." The various types of memory may store information in the form of application data and machine-executable code.

The client 102 includes a clustering module 120 and a computation module 122. The client 102 may upload each of the clustering module 120 and the computation module 122 to the cloud-service provider 104 for execution. The clustering module 120 creates an outer cluster 130 on one or more host machines coupled to the network 106. The one or more host machines provides resources for usage by the client 102. The outer cluster 130 includes a plurality of outer nodes that communicate with each other and work towards a common goal. The plurality of outer nodes includes an outer node 132A and an outer node 132B that may run in the same physical machine or different physical machines. The nodes in the outer cluster 130 may appear to end users and applications as if they are on one single physical server. The combined processing power of the multiple outer nodes in the outer cluster 130 can provide greater throughput and scalability than is available compared to the processing power from a single node. The outer nodes in the outer cluster 130 may communicate in a peer-to-peer manner and may be self-organized. Communication between the outer nodes may be handled by a group communication library, with a network channel providing the core functionality of tracking who is in the cluster and reliably exchanging messages between the cluster members. Outer nodes of the outer cluster 130 may exchange data with each other, and each outer node in the outer cluster 130 may be aware of the other nodes in the cluster and have their information. Although the outer cluster 130 is shown as including two outer nodes, it should be understood that the outer cluster 130 may include more than two nodes (e.g., hundreds of outer nodes).

The clustering module 120 may create the outer cluster 130 on one or more host machines. The outer node 132A, 132B provides an environment in which application code 134A, 134B may execute and/or application data 136A, 136B may be processed and retrieved. For example, the outer node 132A, 132B may execute application code 134A, 134B using application data 136A, 136B. The operating systems 114A and 114B may view the application data 136A and 136B, respectively, within the clustered environment. As discussed, the operating system and hardware storing the application code and/or application data may be owned by a party other than the client 102. Such viewing of and accessibility to the application data 136A, 136B or the application code 134A, 134B by the third party (e.g., cloud-service provider 104A or 104B) may be undesirable if the client 102 desires to keep this data private or secret. In the present disclosure, reference to data or code being "secret" may also refer to the data or code being "private." The client 102 may desire to keep the data private for legal reasons. For example, HIPAA (Health Insurance Portability and Accountability Act of 1996) is legislation that provides data privacy and security provisions for safeguarding medical information. To comply with HIPAA, the client 102 may desire to keep data such as patients' medical records private.

The data may be protected by developing a nested set of clusters. In some examples, the clustering module 120 creates an enclave cluster 140 on the outer cluster 130. The enclave cluster 140 includes an enclave 142A, which includes an inner node 144A and data 146, and an enclave 142B, which includes an inner node 144B and data 147. The enclave may be a hardware security feature that is provided by the hardware. In an example, an enclave may provide an encrypted environment in which data and code are stored. Accordingly, if data or code is stored within the enclave, the owner of the operating system 114A and the hardware 112A are unable to view the data or code, respectively.

For brevity and simplicity, the following may be a description of outer node 132A and enclave 142A and actions that each may perform. This description applies as well to other outer nodes (e.g., outer node 132B) and other enclaves (e.g., enclave 142B). The outer node 132A and the inner node 144A execute on the same hardware 112A, and the outer node 132A and the inner node 144A are a logical division based upon the enclave 142A that is supported by the hardware 112A. The outer node 132A and the inner node 144A are correlated by their physical colocation. In an example, the outer node 132A is a server that executes on a computing device having at least one processor and memory, and the inner node 144A is a secure process running inside the server. The inner node 144A may run in a special mode in which the hardware guarantees cryptographic isolation. The hardware 112A may provide the isolation between the operating system 114A and the enclave 142A inside the hardware environment.

The present disclosure provides techniques for expanding the isolation to the enclave cluster 140. The enclave cluster 140 includes a plurality of inner nodes, and each inner node of the plurality of inner nodes executes within an enclave of the one or more host machines providing the resources 108 and 110. The plurality of inner nodes includes the inner node 144A and the inner node 144B. The inner nodes in the enclave cluster 140 may appear to end users and applications as if they are on one single physical server. The combined processing power of the multiple inner nodes in the enclave cluster 140 can provide greater throughput and scalability than is available compared to the processing power from a single node. The inner nodes in the enclave cluster 140 may communicate in a peer-to-peer manner and may be self-organized. Communication between the inner nodes may be handled by a group communication library, with a network channel providing the core functionality of tracking who is in the cluster and reliably exchanging messages between the cluster members. Inner nodes of the enclave cluster 140 may exchange data with each other, and each inner node in the enclave cluster 140 may be aware of the other nodes in the cluster and have their information. Although the enclave cluster 140 is shown as including two inner nodes, it should be understood that the enclave cluster 140 may include more than two nodes (e.g., hundreds of inner nodes).

A member of the enclave cluster 140 may share data and/or code with other members of the enclave cluster 140, while keeping the data secret from non-members of the enclave cluster. For example, the client 102 may use the inner nodes 144A and 144B in the enclave cluster 140 to share private data and/or code between them, without the private data and/or code being readable by the operating systems 114A and 114B corresponding to the outer nodes 132A and 132B, respectively. Accordingly, the private data and/or code within the enclave is kept secure, even if the outer cluster 130 is compromised.

The outer nodes of the outer cluster 130 may communicate with each other by creating a session key as part of their negotiation to communicate with each other within the outer cluster. In an example, communications between any of the outer nodes of the outer cluster 130 are encrypted. Additionally, the inner nodes within the enclave cluster 140 may communicate cryptographically through keys. The termination of all communication encryption occurs within the encrypted process. Accordingly, the outer cluster 130 may be unable to view the keys being used for the enclaves to talk to each other. An endpoint for the encryption may start at one inner node of the enclave cluster 130 and terminate at another inner node of the enclave cluster 130, to prevent outer nodes from viewing the data.

Figure 2:
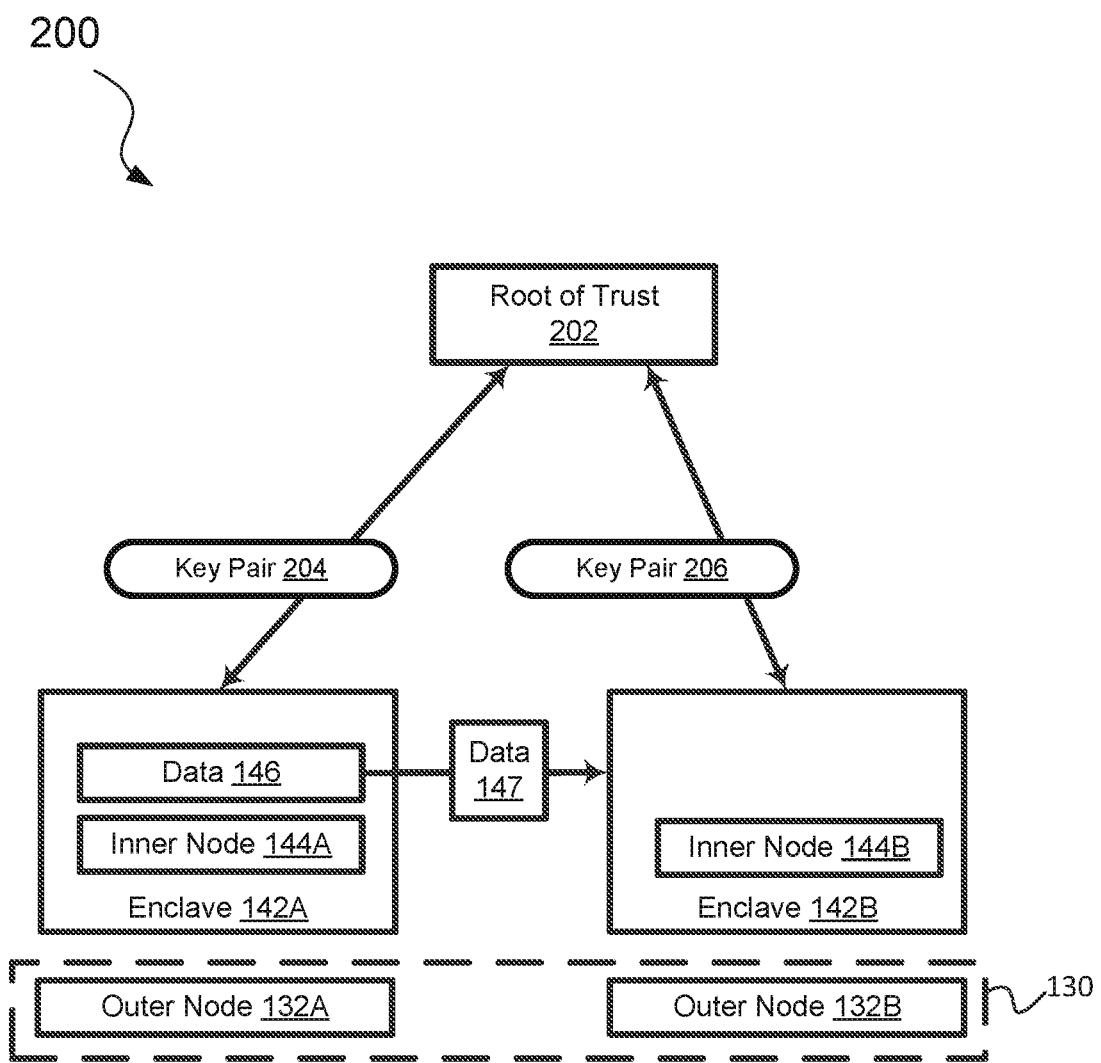
FIG. 2 is a block diagram illustrating an example system for creating an enclave cluster on an outer cluster.

Members of the enclave cluster 140 have established a trust relationship. After the inner nodes have established a trust relationship, they may share data and/or code. FIG. 2 is a block diagram 200 illustrating an example system for creating the enclave cluster on the outer cluster. FIGS. 1 and 2 may be discussed in relation to each other to better understand the trust relationship. In an example, the outer node 132A creates the inner node 144A within the enclave 142A, and the outer node 132B creates the inner node 144B within the enclave 142B. Additionally, the enclave 142A stores data 146, which is secret data. Each of the inner nodes 144A and 144B interacts with a root of trust 202. The root of trust 202 is an external entity that performs attestation of the enclave environment. The inner node 144A may generate a key pair 204 including a public key and a corresponding private key and may send the public key in a x509 certificate to the root of trust 202. The inner node 144B may generate a key pair 206 including a public key and a corresponding private key and may send the public key in a x509 certificate to the root of trust 202. The private keys corresponding to key pairs 204 and 206 are not viewable by the outer cluster.

Within the x509 certificate, the inner node 144A, 144B may provide proof to the root of trust 202 that the inner node 144A, 144B is running in an enclave. The root of trust 202 receives the x509 certificate from the inner node 144A, 144B and determines whether the inner node 144A, 144B has provided sufficient proof that the inner node 144A, 144B is running in an enclave. In an example, an inner node may provide cryptographic proof that the inner node is running inside a hardware isolated environment (e.g., an enclave). If the inner node 144A, 144B has provided sufficient proof, the root of trust 202 signs the certificate and returns the signed certificate to the inner node 144A, 144B. If the inner node 144A, 144B has not provided sufficient proof, the root of trust 202 does not sign the certificate and may provide the inner node 144A, 144B with an indication that the inner node 144A, 144B did not provide sufficient proof of running inside an enclave.

One of the inner nodes 144A and 144B may be elected as the leader of the enclave cluster 140. The leader of the enclave cluster 140 may be the first inner node that is a member of the enclave cluster. In an example, the inner node 144A is elected as the leader in the enclave cluster. The decision regarding which inner node to elect as the leader may be based on a consensus methodology (e.g., Raft consensus algorithm). The leader (or other member of the enclave cluster) negotiates with candidate inner nodes desiring to be part of the enclave cluster. An inner node that requests to join the enclave cluster 140 may be referred to as a candidate inner node. A member of the enclave cluster and the candidate inner node may negotiate for generation of a shared key that can be used for encrypting traffic between them. In an example, the member and the candidate inner node perform a key exchange using a cryptographic protocol that provides end-to-end communications security over a network. The cryptographic protocol may be, for example, Transport Layer Security (TLS) or Secure Socket Layer (SSL). Accordingly, the leader and candidate inner node may create an encrypted channel so that they can communicate with each other, without the outer cluster viewing their communications. The candidate inner node may provide information to the member via the encrypted channel, requesting to join the enclave cluster.

Before allowing a candidate inner node to join the enclave cluster 140, the candidate inner node attests to a member of the enclave cluster that the candidate inner node is running inside an enclave. If the attestation is successful, the same member or a different member of the enclave cluster 140 determines whether the candidate inner node is authorized to access the private data. Attestation is a mechanism for a candidate inner node to provide its identity and the environment in which the candidate inner node is processing and storing data. It may be desirable for the candidate inner node to attest that it is running in an environment with similar security properties as the leader (and other members of the enclave cluster 140) such that data and/or code will not be leaked to members outside of the enclave cluster 140. For example, if a candidate inner node that is not running in an enclave joined the enclave cluster 140, all data and/or code shared with this candidate inner node may be exposed to members outside of the enclave cluster 140.

Attestation may be performed via a hardware specific mechanism that the inner node (e.g., a process) communicating over the network is running inside an enclave. The attestation process may vary between different hardware vendors. If the root of trust 202 returns a signed x509 certificate to an inner node, the root of trust 202 attests that the inner node is running in an enclave. A member of the enclave cluster 140 trusts that the authentication data provided by the root of trust 202 is accurate. Accordingly, the candidate inner node may attest that it is running inside an enclave by providing the candidate inner node's x509 certificate signed by the root of trust 202 to a member of the enclave cluster. If the member receives the candidate inner node's x509 certificate signed by the root of trust 202, the member determines that the candidate inner node is running inside an enclave, and accordingly may successfully authenticate the candidate inner node. If the member does not receive adequate proof that the candidate inner node is running inside an enclave, the member determines that the candidate inner node is not running inside an enclave, and accordingly fails the authentication.

If the candidate inner node has been successfully authenticated, a member of the enclave cluster determines whether the authenticated inner node is authorized to access the private data. Authorization may be implemented as a cluster-wide decision, where the member may act on behalf of the enclave cluster. In an example, the authorization may be implemented via a blacklist. In this example, if the candidate inner node or any component associated with the candidate inner node (e.g., internet protocol (IP) address on which the candidate inner node is running, geographical location of the candidate inner node, etc.) is specified in the blacklist, the candidate inner node is not authorized to access the private data. An empty blacklist may allow all authenticated candidate inner nodes to join the enclave cluster. In another example, the authorization may be implemented via a whitelist. In this example, if the candidate inner node or any component associated with the candidate inner node is specified in the whitelist, the candidate inner node is authorized to access the private data. Other ways to determine whether a candidate inner node is authorized to access the private data are within the scope of the disclosure.

If the candidate inner node has been successfully authenticated and is authorized to access the private date, the candidate inner node may join the enclave cluster. After the candidate inner node joins the enclave cluster, the candidate inner node may be referred to as a member of the enclave cluster. Although the authentication stage has been described as being before the authorization stage, it should be understood that the authentication stage may be after the authorization stage in other examples. For example, a member of the enclave cluster may determine whether the candidate inner node is authorized to access the private data before authenticating the candidate inner node. If the candidate inner node is authorized to view the private data, a member of the enclave cluster may attempt to authenticate the candidate inner node.

The members of the enclave cluster may communicate with each other and share encryption keys with each other. A key may be used for replication of data between a plurality of members of the enclave cluster. Members of the enclave cluster may replicate private data between themselves. Replication may ensure that inner nodes have access to the private data and that the private data is not viewed by members outside of the enclave cluster. Private data may be replicated inside the enclave cluster from one inner node to another inner node of the enclave cluster 140, without exposing the data to any outer nodes of the outer cluster 130.

In some examples, each member of the enclave cluster may have a global view of the data. In an example, the inner node 144A replicates the data 146 to the inner node 144B. In this example, the data 146 stored in the enclave 142A and the data 147 that is to be stored in the enclave 142B may be the same. In some examples, some members of the enclave cluster do not have a global view of the data. In an example, the inner node 144A replicates a first subset of the data 146 to the inner node 144B. In this example, the data 147 that is to be stored in the enclave 142B may be a first subset of the data 146. The inner node 144A may replicate a second subset that is different from the first subset to another inner node (not shown). In another example, an inner node (not shown) replicates a first subset of data to the inner node 144A and a second subset of the data to the inner node 144B. In this example, the data 146 may be the first subset of data, the data 147 may be the second subset of data, and the data 146 is different from the data 147.

In an example, a cluster of a thousand machines may represent the outer cluster, and inside of a protected enclave on each outer cluster, data and code may be encrypted and hidden from the outer cluster and from the host machine. An enclave cluster has access to the private data stored within the enclave and may replicate portions of or all of the data among the inner nodes of the enclave cluster, while the outer cluster may manipulate the data indirectly by requesting manipulation from the enclave cluster.

Referring back to FIG. 1, the computation module 122 may expose, by the enclave cluster 130, one or more application programming interfaces (APIs) to the outer cluster 130. Invocation of an API causes at least one inner node of the enclave cluster to perform an operation on data stored in the enclave cluster, and at least a portion of the data is stored within at least two enclaves in the enclave cluster. Additionally, the computation module 122 performs, by at least one inner node of the enclave cluster, the operation on the data in response to invocation of the API by an outer node of the outer cluster. The client 102 may upload the computation module 122 to the inner nodes of the enclave cluster 130.

As shown in FIG. 1, one or more members of the enclave cluster 140 may expose one or more APIs 148 to the outer cluster 130. The outer node 132 may invoke the API 148A. Invocation of the API 148 may cause at least one inner node of the enclave cluster 140 to perform an operation on data that is stored within at least two enclaves of the enclave cluster 140. In an example, the data 146 includes patients' medical records, and invocation of the API causes an inner node to query the data 146 for a percentage of female patients who have indigestion within six months of giving birth. One or more inner nodes (e.g., via the computation module 122) may perform the operation on the data 146, without exposing any of the private data (e.g., patients' medical records) across the API boundary. The inner nodes of the enclave cluster 140 may communicate with each other regarding which inner node(s) should perform the operation.

In an example, in response to invocation of the API 148A, the inner node 144A, which stores the data 146, may perform the operation on the data 146 and return a result 150 to the requesting outer node 132. In another example, the data 147 may be the same as the data 146, and accordingly the inner node 144B may perform the operation on the data 147 rather than the inner node 144A. The inner nodes of the enclave cluster 140 may communicate, with the understanding that the inner node 144B will perform the operation. In response to invocation of the API 148A, the inner node 144B may perform the operation on the data 147 and return the result 150 to the requesting outer node 132.

In another example, the data 147 is a first subset of the data 146, and a third enclave (not shown) includes a third inner node and third data that is a second subset of the data 146. The data 147 and the third data may together make up the data 146. The inner nodes of the enclave cluster 140 may communicate, with the understanding that the inner node 144B and the third inner node will perform the operation. For example, in response to invocation of the API 148A, the inner node 144B may perform the operation on the data 147, and the third inner node may perform the operation on the third data. The inner node 142B may return a first partial result and the third inner node may return a second partial result, where the first and second partial results are the result 150. In this example, the inner nodes may communicate to determine which inner node will return the result 150 to the requesting outer node 132.

In some examples, the replication of data between the inner nodes may be related to the API invocations. For example, if the inner node 144A is busy and knows that the inner node 144B is not busy, the inner node 144A may replicate the data 146 (or a subset of the data 146) to the inner node 144B so that the inner node 144B may perform the operation on the data (or a subset of the data). The inner node 144A may replicate to a plurality of inner nodes of the enclave cluster 130, with a request to perform the operation on the private data transmitted from the inner node 144A and received by the respective inner node.

The inner nodes of the enclave cluster 140 manipulate the data in a clustered environment, without revealing its content to non-members of the enclave cluster 140. Additionally, the APIs 148 may be carefully crafted to expose only that data that is not private. For example, the API 148 would not provide information such as the names of these women because such a result may cause sensitive information to leak.

As discussed above and further emphasized here, FIGS. 1 and 2 are merely examples, which should not unduly limit the scope of the claims. For example, although one client and two cloud-service providers are illustrated in FIG. 1, other examples including more than one client and/or fewer or more than two cloud-service providers are within the scope of the present disclosure. Additionally, it should be understood that the hardware 112A, 112B may be physical hardware or virtual hardware. If the hardware 112A is virtual hardware, the enclave technology is supported by the virtual machines on which the guest operating systems run.

Figure 3:
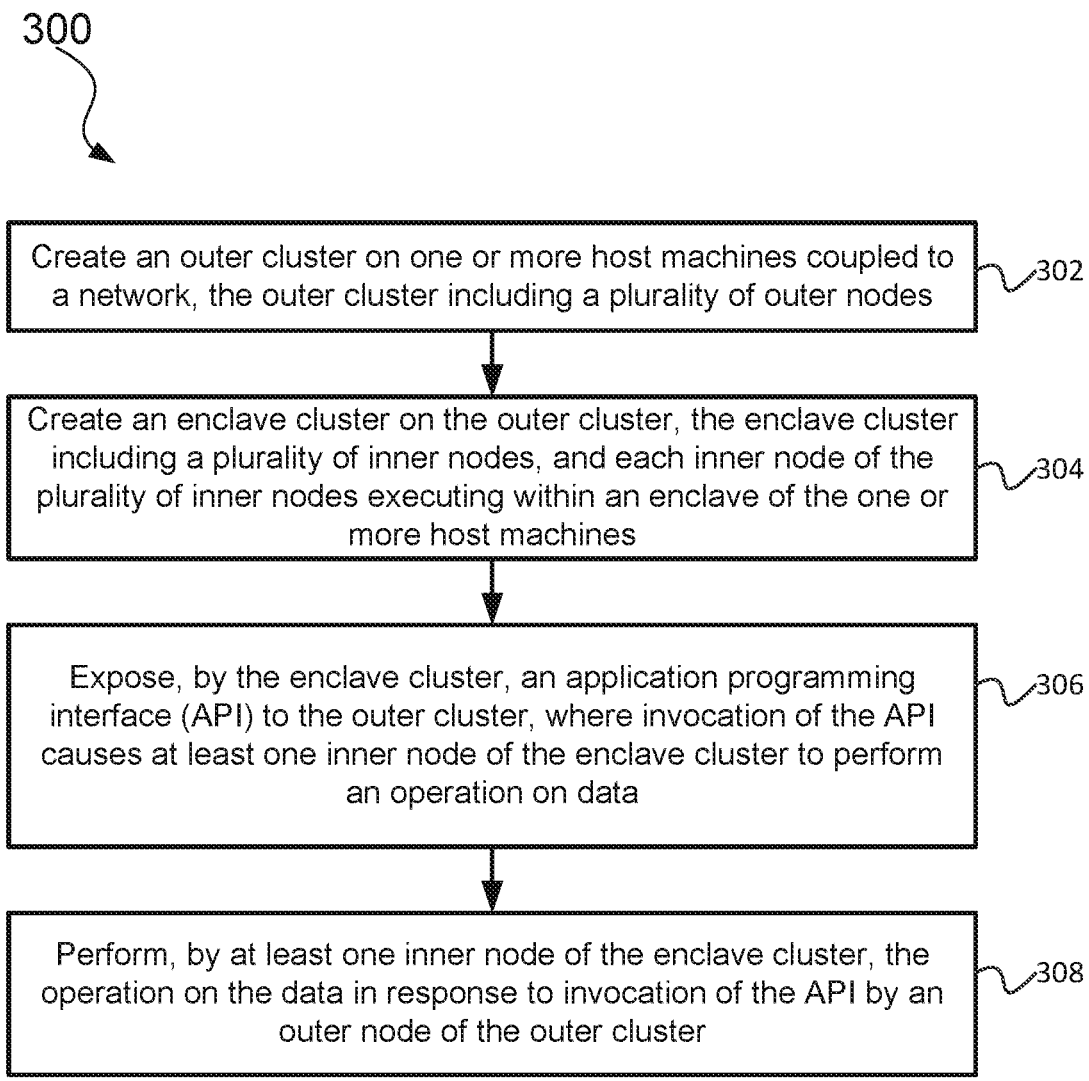
FIG. 3 is an example flow diagram of a method for protecting data in a clustered environment.

FIG. 3 is an example flow diagram of a method 300 for protecting data in a clustered environment. Actions of the method 300 can be executed by a computing device (e.g., a processor, processing circuit, and/or other suitable component) or other suitable means for performing the actions. For example, a computing device may utilize one or more components (e.g., clustering module 120 or computation module 122) to execute the actions of the method 300. As illustrated, the method 300 includes a number of enumerated actions, but examples of the method 300 may include additional actions before, after, and in between the enumerated actions. In some examples, one or more of the enumerated actions may be omitted or performed in a different order.

Method 300 includes blocks 302-308. In a block 302, the method 300 includes creating an outer cluster on one or more host machines coupled to a network, the outer cluster including a plurality of outer nodes. In a block 304, the method 300 includes creating an enclave cluster on the outer cluster, the enclave cluster including a plurality of inner nodes, and each inner node of the plurality of inner nodes executing within an enclave of the one or more host machines. In a block 306, the method 300 includes exposing, by the enclave cluster, an application programming interface (API) to the outer cluster, wherein invocation of the API causes at least one inner node of the enclave cluster to performing an operation on data. In a block 308, the method 300 includes performing, by at least one inner node of the enclave cluster, the operation on the data in response to invocation of the API by an outer node of the outer cluster.

It is also understood that additional processes may be inserted before, during, or after blocks 302-308 discussed above. It is also understood that one or more of the blocks of method 300 described herein may be omitted, combined, or performed in a different sequence as desired.

Figure 4:
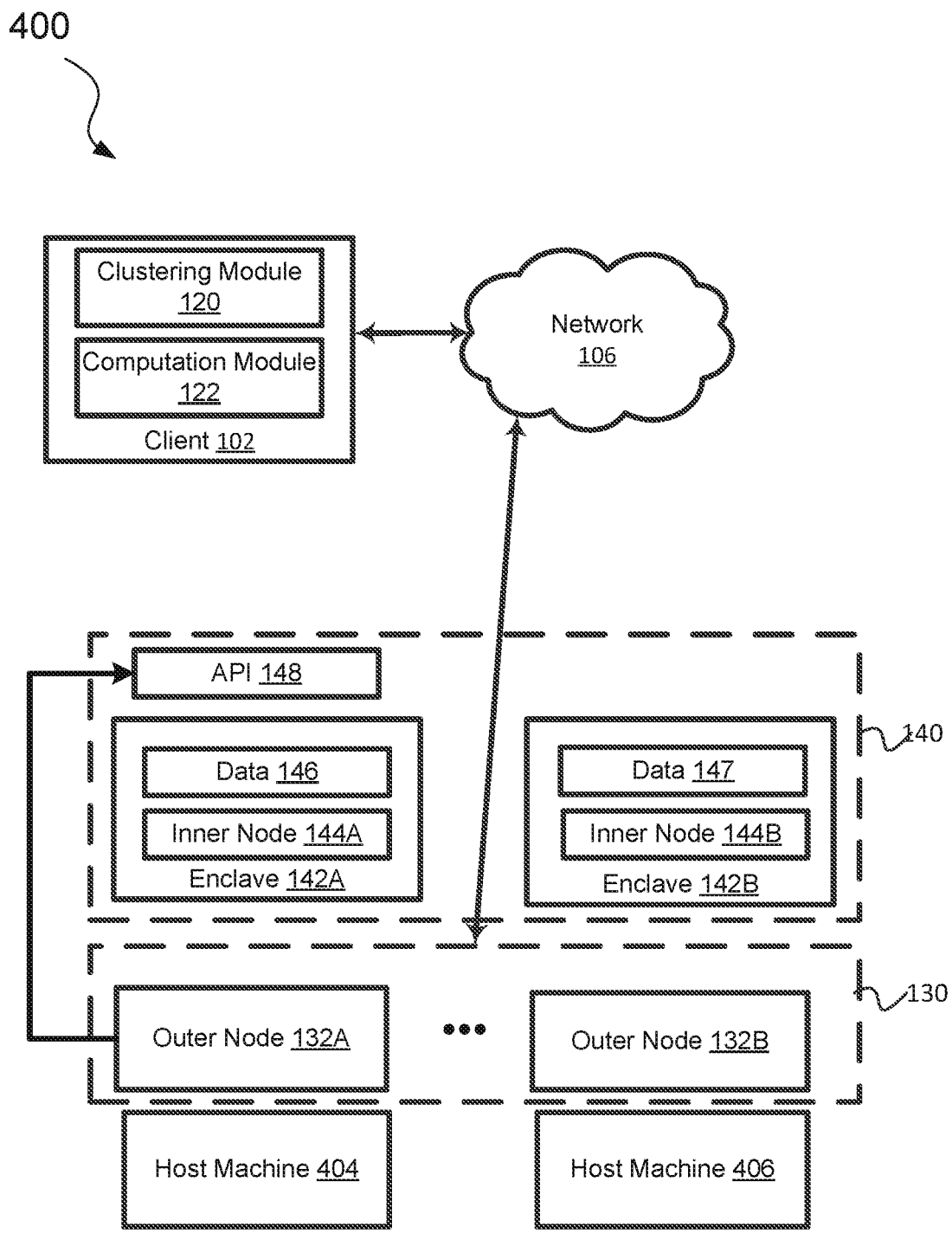
FIG. 4 is a block diagram illustrating an example system for protecting data in a clustered environment.

FIG. 4 is a block diagram 400 illustrating an example system for protecting data in a clustered environment. In FIG. 4, the clustering module 120 creates the outer cluster 130 on one or more host machines 404, 406 coupled to the network 106, the outer cluster 130 including the outer nodes 132A and 132B. Additionally, the clustering module 120 creates the enclave cluster 140 including the inner nodes 144A and 144B on the outer cluster 130. The inner node 144A executes within the enclave 142A of the host machine 404, and the inner node 144B executes within the enclave 144B of the host machine 406.

The computation module 122 exposes, by the enclave cluster 140, one or more APIs 148 to the outer cluster 130. Invocation of the API 148 causes at least one inner node of the enclave cluster 140 to perform an operation on data 146. In some examples, at least a portion of the data 146 is stored within at least two enclaves 142A and 142B. At least one inner node of the enclave cluster 140 performs the operation on the data in response to invocation of the API 148 by the outer node 132A of the outer cluster 130.

Figure 5:
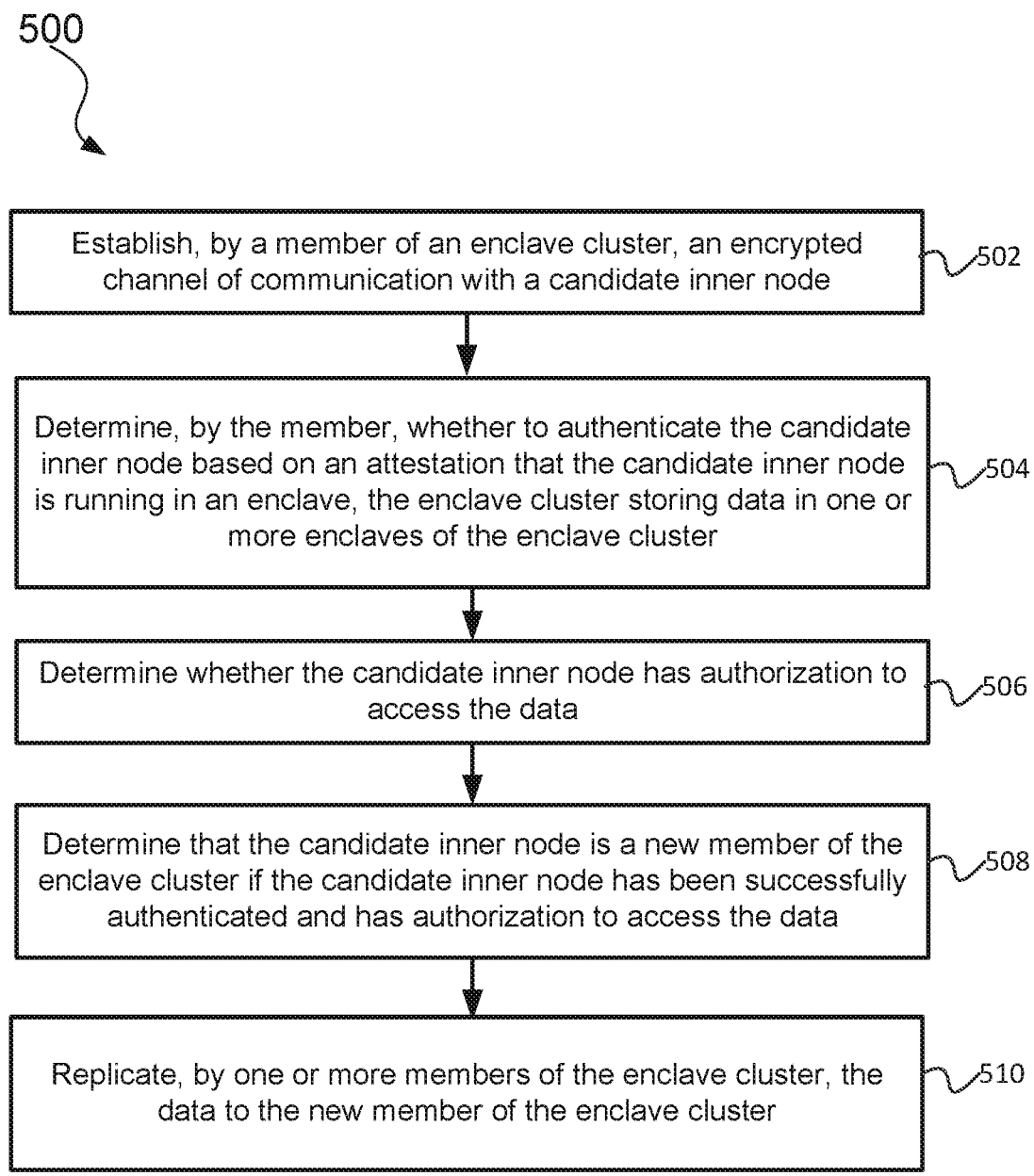
FIG. 5 is an example flow diagram of a method for creating an enclave cluster.

FIG. 5 is an example flow diagram of a method 500 for creating an enclave cluster. Actions of the method 500 can be executed by a computing device (e.g., a processor, processing circuit, and/or other suitable component) or other suitable means for performing the actions. For example, a computing device may utilize one or more components (e.g., clustering module 120 or computation module 122) to execute the actions of the method 500. As illustrated, the method 500 includes a number of enumerated actions, but examples of the method 500 may include additional actions before, after, and in between the enumerated actions. In some examples, one or more of the enumerated actions may be omitted or performed in a different order.

Method 500 includes blocks 502-510. In a block 502, the method 500 includes establishing, by a member of the enclave cluster 140, an encrypted channel of communication with a candidate inner node. In a block 504, the method 500 includes determining, by the member, whether to authenticate the candidate inner node based on an attestation that the candidate inner node is running in an enclave, the enclave cluster storing data in one or more enclaves of the enclave cluster 140. In a block 506, the method 500 includes determining whether the candidate inner node has authorization to access the data. In a block 508, the method 500 includes determining that the candidate inner node is a new member of the enclave cluster if the candidate inner node has been successfully authenticated and has authorization to access the data. In a block 510, the method 500 includes replicating, by one or more members of the enclave cluster, the data to the new member of the enclave cluster 140.

In some examples, blocks 502-510 may be performed for any number of nodes attempting to join the enclave cluster 140. It is also understood that additional processes may be inserted before, during, or after blocks 502-510 discussed above. It is also understood that one or more of the blocks of method 500 described herein may be omitted, combined, or performed in a different sequence as desired.

Figure 6:
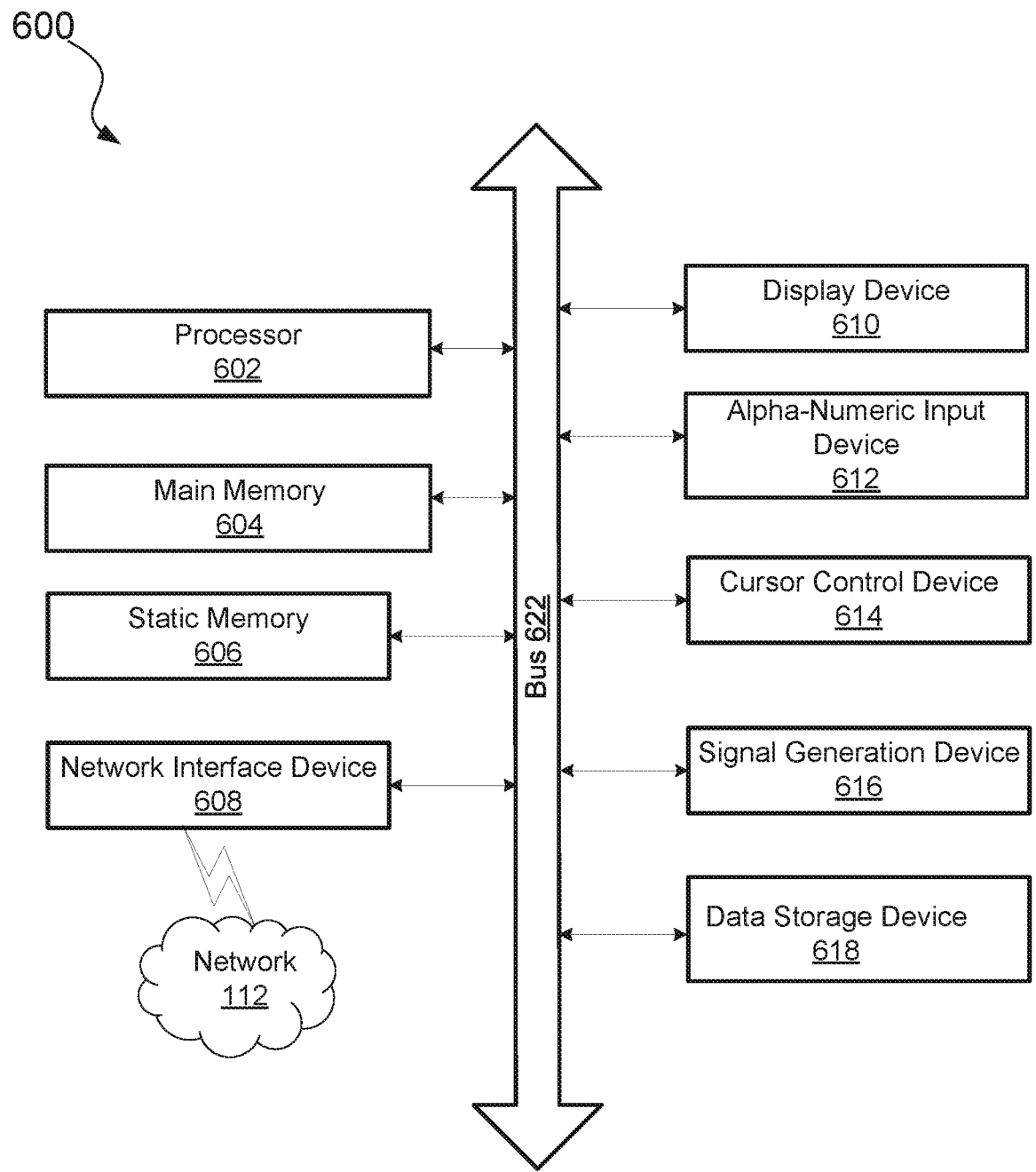
FIG. 6 illustrates a system diagram of an example machine that may perform one or more of the operations described herein.

FIG. 6 illustrates a system diagram of a machine 600 within which a set of instructions, for causing the machine to perform any one or more of the methodologies discussed herein, may be executed in the example form of a client 102, clustering module 120, and/or computation module 122. The machine 600 may be connected (e.g., networked) to other machines in a local area network (LAN), an Intranet, an extranet, or the Internet. The machine 600 may operate in the capacity of a server or a client machine in a client-server network environment, or as a peer machine in a peer-to-peer (or distributed) network environment. The machine 600 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

In the present example, the machine 600 includes a processor 602, main memory 604, static memory 606, and a data storage device 618, which communicate with each other via a bus 622. A "processor" may also be referred to as a "central processing unit" ("CPU") or "physical processor" herein. The processor 602 may refer to a device capable of executing instructions encoding arithmetic, logical, or input/output (I/O) operations. The processor 602 represents one or more general-purpose processing devices such as a microprocessor, central processing unit (CPU), or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), a network processor, or the like.

In an example, the processor 602 may follow the Von Neumann architectural model and may include an arithmetic logic unit (ALU), a control unit, and a plurality of registers. In a further aspect, the processor 602 may be a single-core processor that is typically capable of executing one instruction at a time (or processing a single pipeline of instructions), or a multi-core processor that may simultaneously execute multiple instructions. In another aspect, a processor may be implemented as a single-integrated circuit, two or more integrated circuits, or may be a component of a multi-chip module (e.g., in which individual microprocessor dies are included in a single integrated circuit package and hence share a single socket). The processor 602 is configured to execute instructions for performing the operations, actions, and steps discussed herein (e.g., the method 300 discussed in relation to FIG. 3 and/or the method 500 discussed in relation to FIG. 5).

The memory may be one or more of many different types of memory. "Memory" herein may refer to volatile or non-volatile memory, such as random-access memory (RAM), ROM, electrically erasable ROM (EEPROM), or any other memory capable of storing data. Some types of memory, such as solid-state drives typically have relatively larger storage volume but relatively slower performance. Other types of memory, such as those used for RAM, are optimized for speed and may be referred to as "working memory." The various types of memory may store information in the form of software and data. The software may include an operating system and various other software applications. Main memory 604 may be, for example, ROM, flash memory, dynamic random-access memory (DRAM) such as synchronous DRAM (SDRAM), double data rate (DDR SDRAM), or DRAM (RDRAM), and so forth. Static memory 606 may be, for example, flash memory, static random-access memory (SRAM), and so forth.

The machine 600 may further include a network interface device 608, an alphanumeric input device 612 (e.g., a keyboard) that accepts input from a user, a cursor control device 614 (e.g., a mouse) that accepts input from a user, a signal generation device 616 (e.g., a speaker), and a display device 610. In an example, the client 102 may provide via the input device 612 user input that causes an outer cluster and an enclave cluster to be created.

The display device 610 may be a physical display device that displays data processed by the machine 600. The physical display device may be, for example, a Liquid-Crystal Display (LCD), High-Definition Multimedia Interface (HDMI) device, a monitor, a television, a projection device, a plasma display panel, a light emitting diode (LED) array, a cathode ray tube (CRT) display, electronic paper, a surface-conduction electron-emitted display (SED), a laser television display, a nanocrystal display, or another type of display unit. The display may be physically attached to the machine 600 or separate from and physically coupled via a wired or wireless connection to the machine 600. In an example, the display device 610 is part of, and integrated into, the machine 600 (e.g., a screen of the computing system and/or the client device). The display device 610 may be sold with and attached to the computing system and/or the client device such that when a user views content via the computing system and/or the client device, the content is displayed on the display device 610. It will be appreciated that other physical display devices are contemplated, and that the various types named herein are not limiting.

The data storage device 618 may include a computer-readable storage medium that stores one or more sets of instructions (e.g., software) embodying any one or more of the methodologies or functions described herein. The instructions may also reside, completely or at least partially, within main memory 604 and/or within the processor 602 during execution thereof by the machine 600. Additionally, the main memory 604 and the processor 602 may also constitute computer-readable storage media. The instructions may further be transmitted or received over the network 112 via the network interface device 608. While the data storage device 618 is shown in an example to be a single medium, the term "data storage device" should be taken to include a single medium or multiple media (e.g., a centralized or distributed database, and/or associated caches and servers) that store the one or more sets of instructions. The term "computer-readable storage medium" may also be taken to include any medium that is capable of storing, encoding, or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. The steps or actions are those causing physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

Certain examples of the present disclosure also relate to an apparatus for performing the operations herein. This apparatus may be constructed for the intended purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative examples have been shown and described, a wide range of modification, change, and substitution is contemplated in the foregoing disclosure and in some instances, some features of the disclosure may be employed without a corresponding use of other features. One of ordinary skill in the art would recognize many variations, alternatives, and modifications. Thus, the scope of the disclosure should be limited only by the following claims, and it is appropriate that the claims be construed broadly and in a manner consistent with the scope of the disclosure disclosed herein.

I claim:

1. A method of protecting data, comprising:
creating an outer cluster on one or more host machines coupled to a network, the outer cluster including a plurality of outer nodes;
creating an enclave cluster on the outer cluster, the enclave cluster including a plurality of inner nodes, and each inner node of the plurality of inner nodes executing within an enclave of the one or more host machines;
exposing, by the enclave cluster, an application programming interface (API) to the outer cluster, wherein invocation of the API causes at least one inner node of the enclave cluster to perform an operation on first data; and performing, by at least one inner node of the enclave cluster, the operation on the first data in response to invocation of the API by a first outer node of the outer cluster.

2. The method of claim 1, further comprising:
returning a result of the performing the operation to the first outer node.

3. The method of claim 1, wherein the plurality of inner nodes includes a first inner node and a second inner node, the method further comprising:
replicating, by the first inner node, the first data to the second inner node, wherein
performing the operation includes performing, by the first inner node, the
operation on the first data.

4. The method of claim 1, wherein the plurality of inner nodes includes a first inner node and a second inner node, the method further comprising:
receiving, by the second inner node, the first data replicated from the first inner node,
wherein performing the operation includes performing, by the second inner node,
the operation on the first data.

5. The method of claim 1, wherein the plurality of inner nodes includes a first inner node, a second inner node, and a third inner node, the method further comprising:
receiving, by the second inner node, a first subset of the first data replicated from the first inner node, wherein performing the operation includes performing, by the second inner node, the operation on the first subset; and
receiving, by the third inner node, a second subset of the first data replicated from the first inner node, wherein performing the operation includes performing, by the third inner node, the operation on the second subset.

6. The method of claim 1, wherein creating the enclave cluster includes for each outer node of the outer cluster, creating a first enclave on the same hardware on which the respective outer node executes and creating an inner node that executes within the first enclave.

7. The method of claim 1, wherein creating the enclave cluster further includes:
establishing, by a first inner node, an encrypted channel of communication with a second inner node, wherein the first inner node is a member of the enclave cluster and the second inner node is a non-member of the enclave cluster.

8. The method of claim 7, wherein creating the enclave cluster further includes:
determining, by the first inner node, whether to authenticate the second inner node based on an attestation that the second inner node is running in a first enclave, the enclave cluster storing data;
determining, by the first inner node, whether the second inner node has authorization to access the first data.

9. The method of claim 8, further comprising:
determining, by the first inner node, that the second inner node is a new member of the enclave cluster if the second inner node has been successfully authenticated and has authorization to access the first data.

10. The method of claim 9, further comprising:
replicating, by the first inner node, the first data to the second inner node.

11. The method of claim 9, further comprising:
receiving, by the first inner node, second data replicated from the second inner node.

12. The method of claim 1, wherein at least a portion of the first data is stored within at least two enclaves.

13. A system for protecting data, comprising:
a processor;
a memory coupled to the processor, wherein the memory comprises instructions that, when executed by the processor to:
create an outer cluster on one or more host machines coupled to a network;
create an enclave cluster on the outer cluster, wherein the outer cluster includes a plurality of outer nodes, the enclave cluster includes a plurality of inner nodes, and each inner node of the plurality of inner nodes executes within an enclave of the one or more host machines; and
expose, by the enclave cluster, an API to the outer cluster; and
perform, by at least one inner node of the enclave cluster, an operation on data in response to invocation of the API by a first outer node of the outer cluster.

14. The system of claim 13, wherein a first cloud-service provider provides hardware on which the first outer node is running to a client.

15. The system of claim 14, wherein the clustering module creates the first outer node on the hardware and creates an inner node on the first outer node.

16. The system of claim 15, wherein the inner node of the enclave cluster returns a result of performing the operation to the first outer node.

17. The system of claim 15, wherein the first outer node is a server, and the inner node is a secure process running inside the server.

18. The system of claim 13, wherein the plurality of inner nodes includes a first inner node and a second inner node, and the first inner node replicates the data to the second inner node and performs the operation on the data.

19. The system of claim 13, wherein the plurality of inner nodes includes a first inner node and a second inner node, and the second inner node receives the data replicated from the first inner node and performs the operation on the data.

20. A non-transitory machine-readable medium comprising a plurality of machine-readable instructions that when executed by one or more processors is adapted to cause the one or more processors to perform a method comprising:
creating an outer cluster on one or more host machines coupled to a network, the outer cluster including a plurality of outer nodes;
creating an enclave cluster on the outer cluster, the enclave cluster including a plurality of inner nodes, and each inner node of the plurality of inner nodes executing within an enclave of the one or more host machines;
exposing, by the enclave cluster, an API to the outer cluster, wherein invocation of the API causes at least one inner node of the enclave cluster to perform an operation on data; and
performing, by at least one inner node of the enclave cluster, the operation on the data in response to invocation of the API by an outer node of the outer cluster.

* * * * *